Patented May 1, 1945

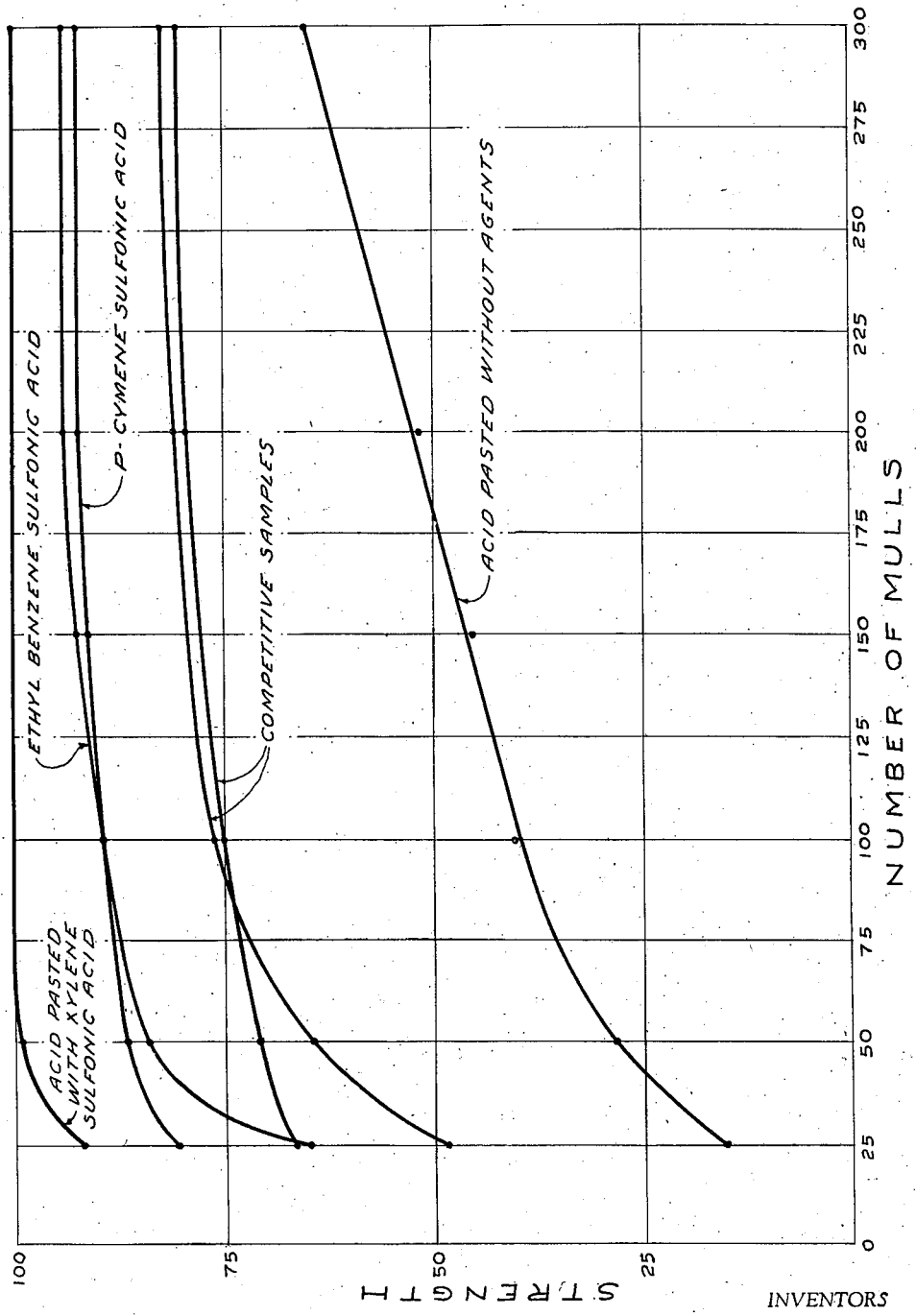

2,375,120

UNITED STATES PATENT OFFICE 2,375,120

PORPHINE PIGMENTS

Serge Alexander Loukomsky, Bound Brook, and Harold Talbot Lacey, Plainfield, N. J., assignors to American Cyanamid Company, New York, N. Y., a corporation of Maine Application November 8, 1941, Serial No. 418,302

18 Claims. (Cl. 260—314.5)

This invention relates to improved pigments of the porphine series which are soluble in concentrated sulfuric acid. More particularly the invention is concerned with improvement of pigment of the phthalocyanine series.

The pigments having the tetraza-porphine ring and commonly known as phthalocyanine pigments particularly the commercially most important one, copper phthalocyanine, have achieved considerable practical importance as they give shades of good brightness and excellent color fastness. It is the practice not to use the pigments in the form in which they are prepared as their tinctorial value is low and their color is dull due to impurities, crystal form, particle size, and the like. It is customary to purify the pigments by dissolving them in concentrated sulfuric acid and precipitating by dilution with water or dilute sulfuric acid, followed by suitable washing. Presscakes obtained by this method, while possessing high ultimate color value, are not readily grindable as hard aggregation takes place in the purification of the pigment and drying, and considerable difficulty is noted in grinding the pigments into various organic media for inks, lacquers, and other coating compositions. The difficult grinding is primarily due to the formation of hard aggregates in the precipitation from sulfuric acid and in the grinding. A relatively soft pigment of the phthalocyanine type has long been desired but hitherto necessary in introducing the pigments into organic media if dispersions of high tinctorial value and bright shades are desired.

According to the present invention, very soft phthalocyanine pigments are obtained by the addition of relatively large amounts of sulfonic acids or salts of sulfonic acids of alkylated monocyclic aromatic compounds having more than one carbon atom in the alkyl chain or chains, to the sulfuric acid solution of the pigments followed by drowning, washing, an alkaline boil, again washing, and drying. Pigments thus obtained are of an extraordinary softness which has not hitherto been obtainable. The present invention should not be confused with the common practice of adding wetting agents which may be sulfonic acids such as sulfonated alkyl naphthalenes, sulfonated dinaphthylmethane, and the like. These wetting agents which are added to or retained in the final pigment do add to its dispersibility because they increase the wettability of the pigment, but they do not materially affect the softness of the pigment and the grinding difficulties are therefore not overcome. The behavior of the sulfonic acids of the present invention is quite different. They do not effect wettability in the final product because they are washed out and are entirely removed, but they appear to exert an action in the purification step which results in soft, relatively unaggregated pigments. Where additional wettability is desired, wetting agents can be incorporated with the soft pigments of the present invention and they perform their customary function, which however, is not the same as that performed by the sulfonic acids in the purification process itself.

In order to express the softness numerically, a softness test was used which is standard with the A. S. T. M. (see A. S. T. M. Standards 1939 part II, pages 660–663). The muller used was a standard glass muller three inches in diameter, weighed with a 16 pound lead weight and details of carrying out the test are as follows:

0.500 grams of pigment were mixed with
1.250 grams of No. 1 transparent lithographic varnish with a palette knife, and ground with a weighed (16 pounds) 3 inch glass muller a specifier number of full double strokes or mulls, gathering every 25 mulls.

In this manner inks ground to 25, 50, 100, 150, 200 and 300 strokes were obtained. These inks were diluted with white ink without further mulling and their strength compared.

The different organic sulfonic acids employed in the present invention are not equally effective. For example, single isomeric xylene sulfonic acids are not quite as effective as the mixed zylene sulfonic acids. These preferred materials give a product which reaches substantially full strength in 50 mulls or less and constitute the preferred modifications of the present invention.

The ratio of sulfonic acid to pigment may vary upward from a ratio of approximately 1:4 by weight to much larger ratios. Best results are usually obtained with a ratio of sulfonic acid to pigment of about 2:1 by weight. The results remain almost equally as good up to about 4:1, and no falling off is noted until the amount is very large, there being a slight falling off in softness when the sulfonic acid to pigment ratio exceeds 12:1. Even then, much softer pigments are obtained than when no sulfonic acid is used.

Another important modification consists in boiling the precipitated pigment with the addition of sufficient alkali to produce a definitely alkaline medium for some time, which appears to improve the shade and strength. In its more specific aspects, the invention includes this additional feature. Similar results may be obtained by long boiling with water instead of a shorter boiling with alkali but because of the saving in time the alkali boil is economically preferable.

The improved method of purification by solution in sulfuric acid and precipitation by dilution, commercially referred to in the art as acid pasting, may be applied generally to the sulfuric acid stable pigments of the porphine series, both the metal-free compounds and the metal derivatives which are stable. Thus, for example, metal-free phthalocyanine can be treated by the present invention as can the stable metal compounds with copper, zinc, iron, cobalt, nickel, and the like. Not only phthalocyanine itself and its stable metal compounds may be used, but also other tetraza-porphines and their stable metal derivatives, such as e. g. tetranaphtho tetraza-porphines, alkyl and aryl derivatives of phthalocyanine, halogenated phthalocyanine, tetrazoporphines with fused heterocyclic rings, and the like. Also tetra benzo-porphine, tetrabenzo-triaza-porphine and similar compounds and their sulfuric-acid-stable metal complexes may be subjected to this process, but the method yields particularly useful results in the case of copper phthalocyanine.

In addition to the xylene sulfonic acids which are preferred, sulfonic acids of other alkylated mono-nuclear aromatic hydrocarbons such as amylbenzene, para-cymene, and the like, may be employed. Such compounds, it will be recognized, are all hygroscopic. The invention is not limited to the use of any particular sulfonic acid although we have found that the mono-sulfonic acids of alkylated mono-nuclear aromatic hydrocarbons in which the total number of C atoms in the side chains does not exceed 5 carbon atoms, appear to give the best results.

The invention will be described in greater detail in conjunction with the following examples and with the drawing which is a series of curves plotting pigment strengths against number of mulls for various products. The strength at any given number of mulls or the number of mulls required to obtain full strength of the product are taken as a measure of its softness.

EXAMPLE 1

(a) Add 1 part of copper phthalocyanine slowly and uniformly to 14 parts of 93% to 98% sulfuric acid at 50° to 60° C. Heat at 65° C. until dissolved (30 minutes to 60 minutes).

(b) Add 2 parts of mixed xylenes (for 1 part of pigment), slowly, to 4 parts of 93% to 98% sulfuric acid, and keep the temperature between 60° and 70° by the rate of addition, and cooling. Sulfonation should be complete in 45 to 60 minutes so that a clear liquid is obtained with only a slight odor of xylene.

(c) Add the sulfonated xylene (b) to the pigment-acid solution (a) and stir for 5 to 10 minutes or until uniform.

(d) Run the solution onto the surface of 100 parts of ice water containing enough ice so that the temperature remains below 30° C. (If a larger volume of cold water is used, less ice will be necessary.) The addition should take place slowly, preferably through a spraying device, and the ice water should be well stirred.

(e) Wash by decantation until neutral or only slightly acid to Congo red paper.

(f) Neutralize if necessary with caustic soda solution, then add enough sodium hydroxide to make a 0.5% solution and boil 30 minutes. (Alternately boil 30 minutes in a 0.5% solution of $Na_2CO_3$ or $NH_4OH$, or boil 3 hours in a suspension in water.)

(g) Filter, wash salt free, and dry in the air at 60° to 70° C.

The product when tested by the softness test reached full strength at 150 mulls and was 54% stronger than material acid pasted in the same way without xylene sulfonic acid after 300 mulls.

EXAMPLE 2

(a) Add 1 part of copper phthalocyanine slowly and uniformly to 18 parts of 93% to 98% sulfuric acid at 50° to 60° C. Heat at 65° C. until dissolved which requires 30 to 60 minutes.

(b) Add 2 parts of xylene (per 1 part of pigment) to the pigment-acid solution prepared according to (a), keeping the temperature between 60° and 70° C. until the xylene has been completely sulfonated.

(c) Run the solution onto the surface of 100 parts of ice water containing enough ice so that the temperature remains below 30° C. (If a larger volume of water is used, less ice will be necessary.) The addition should take place slowly, preferably through a spraying device, and the ice water should be well stirred.

(d) Wash by decantation until neutral or only slightly acid to Congo red paper.

(e) Neutralize if necessary with caustic soda solution, then add enough sodium hydroxide to make a 0.5% solution and boil 30 minutes. (Alternately boil 30 minutes in a 0.5% solution of $Na_2CO_3$ or $NH_4OH$, or boil 3 hours in a suspension in water.)

(f) Filter, wash salt free, and dry in the air at 60° to 70° C.

The product when tested by the softness test above showed the same results as in Example 1.

A number of other tests were made using the same procedure as in the foregoing examples but substituting sulfonated ethylbenzene and sulfonated p-cymene for the sulfonated mixed xylenes. Two competitive copper-phthalocyanine products marked H and D were tested. They represented products available on the market, the process used in preparing them being unknown.

The following table shows comparative strengths of pigments subjected to the softness test described above. The table includes not only tests on the xylene sulfonic acid pasted material of the examples but also material in which the amount of the xylene sulfonate acid was 4:1 and 12:1 and further includes strengths of material acid pasted with mono-sulfonated ethylbenzene and mono-sulfonated p-cymene and two competitive products. It will be apparent that the results with larger amounts of xylene sulfonic acid do not markedly differ from the 2:1 ratio, although, as seen in the table below, the maximum strength is not obtained with as few mulls. The results with mono-sulfonated ethylbenzene and mono-sulfonated p-cymene are only slightly inferior and markedly superior to the standard and also to the competitive materials available on the market.

TABLE

*Softness tests*

| Aromatic sulfonic acid of— | Ratio of aromatic sulfonic acid to pigment | Percent maximum strength at the following number of mulls | | | | | | Comparison vs. standard at 300 mulls |
|---|---|---|---|---|---|---|---|---|
| | | 25 | 50 | 100 | 150 | 200 | 300 | |
| None | | 23 | 43 | 61 | 72 | 81 | 100 | 100 |
| Commercial mixed xylenes | 2:1 | 95 | 98 | 99 | 100 | 100 | 100 | 154 |
| Do | 4:1 | 92 | 98 | 98 | 99 | 99 | 100 | 150 |
| Do | .12:1 | 72 | 87 | 97 | 99 | 100 | 100 | 150 |
| Ethylbenzene | 2:1 | 65 | 89 | 94 | 98 | 100 | 100 | 145 |
| p-Cymene | 2:1 | 88 | 94 | 96 | 98 | 100 | 100 | 142 |
| Competition (H) | | 79 | 89 | 96 | 97 | 99 | 100 | 125 |
| Competition (D) | | 58 | 77 | 92 | 95 | 98 | 100 | 128 |

We claim:

1. A method of processing pigments of the phthalocyanine type which comprises diluting a sulfuric acid solution of the crude pigment containing a hygroscopic sulfonated alkylated monocyclic aromatic hydrocarbon having more than one side chain carbon atom, the sulfonic acid being present to the extent of at least 25% by weight of the pigment, and removing the sulfonated hydrocarbon from the pigment.

2. A method of processing pigments of the phthalocyanine type which comprises diluting a sulfuric acid solution of the crude pigment containing a hygroscopic sulfonated alkylated monocyclic aromatic hydrocarbon having more than one side chain carbon atom, the sulfonic acid being present to the extent of from about 200–400% by weight of the pigment, and removing the sulfonated hydrocarbon from the pigment.

3. A method of processing pigments of the phthalocyanine type which comprises diluting a sulfuric acid solution of the crude pigment containing mono-sulfonated mixed xylenes in an amount equal to at least 25% by weight of the pigment, and removing the sulfonated hydrocarbon from the pigment.

4. A method of processing pigments of the phthalocyanine type which comprises diluting a sulfuric acid solution of the crude pigment containing mono-sulfonated mixed xylenes in amounts from about 200–400% by weight of the pigment, and removing the sulfonated hydrocarbon from the pigment.

5. A method of processing copper phthalocyanine which comprises diluting a sulfuric acid solution of the crude pigment containing a hygroscopic sulfonated alkylated monocyclic aromatic hydrocarbon having more than one side chain carbon atom, the sulfonic acid being present to the extent of at least 25% by weight of the copper phthalocyanine, and removing the sulfonated hydrocarbon from the pigment.

6. A method of processing copper phthalocyanine which comprises diluting a sulfuric acid solution of the crude pigment containing a hygroscopic sulfonated alkylated mono-cyclic aromatic hydrocarbon having more than one side chain carbon atom, the sulfonic acid being present to the extent of from about 200–400% by weight of the copper phthalocyanine, and removing the sulfonated hydrocarbon from the pigment.

7. A method of processing copper phthalocyanine which comprises diluting a sulfuric acid solution of the crude pigment containing mono-sulfonated mixed xylenes in an amount at least 25% by weight of the copper phthalocyanine, and removing the sulfonated hydrocarbon from the pigment.

8. A method of processing copper phthalocyanine which comprises diluting a sulfuric acid solution of the crude pigment containing mono-sulfonated mixed xylenes in amounts from about 200–400% by weight of the copper phthalocyanine, and removing the sulfonated hydrocarbon from the pigment.

9. A method of processing pigments of the phthalocyanine type which comprises diluting a sulfuric acid solution of the crude pigment containing a hygroscopic sulfonated alkylated monocyclic aromatic hydrocarbon having more than one side chain carbon atom, the sulfonic acid being present to the extent of at least 25% by weight of the pigment, boiling in the presence of an alkali, recovering the precipitate, washing out the sulfonated hydrocarbon, and drying the pigment.

10. A method of processing pigments of the phthalocyanine type which comprises diluting a sulfuric acid solution of the crude pigment containing a hygroscopic sulfonated alkylated monocyclic aromatic hydrocarbon having more than one side chain carbon atom, the sulfonic acid being present to the extent of from about 200–400% by weight of the pigment, boiling in the presence of alkali, recovering the precipitate, washing out the sulfonated hydrocarbon, and drying the pigment.

11. A method of processing pigments of the phthalocyanine type which comprises diluting a sulfuric acid solution of the crude pigment containing mono-sulfonated mixed xylenes in an amount at least 25% by weight of the pigment, boiling in the presence of alkali, recovering the precipitate, washing out the sulfonated hydrocarbon, and drying the pigment.

12. A method of processing pigments of the phthalocyanine type which comprises diluting a sulfuric acid solution of the crude pigment containing mono-sulfonated mixed xylenes in amounts from about 200–400% by weight of the pigment, boiling in the presence of alkali, recovering the precipitate, washing out the sulfonated hydrocarbon, and drying the pigment.

13. A method of processing copper phthalocyanine which comprises diluting a sulfuric acid solution of the crude pigment containing a hygroscopic sulfonated alkylated mono-cyclic aromatic hydrocarbon having more than one side chain carbon atom, the sulfonic acid being present to the extent of at least 25% by weight of the copper phthalocyanine, boiling in the presence of alkali, recovering the precipitate, washing out the sulfonated hydrocarbon, and drying the pigment.

14. A method of processing copper phthalocyanine which comprises diluting a sulfuric acid solution of the crude pigment containing a hygroscopic sulfonated alkylated mono-cyclic aromatic hydrocarbon having more than one side chain carbon atom, the sulfonic acid being present to the extent of from about 200-400% by weight of the copper phthalocyanine, boiling in the presence of alkali, recovering the precipitate, washing out the sulfonated hydrocarbon, and drying the pigment.

15. A method of processing copper phthalocyanine which comprises diluting a sulfuric acid solution of the crude pigment containing monosulfonated mixed xylenes in an amount at least 25% by weight of the copper phthalocyanine, boiling in the presence of alkali, recovering the precipitate, washing out the sulfonated hydrocarbon, and drying the pigment.

16. A method of processing copper phthalocyanine which comprises diluting a sulfuric acid solution of the crude pigment containing monosulfonated mixed xylenes in amounts from about 200-400% by weight of the copper phthalocyanine, boiling in the presence of alkali, recovering the precipitate, washing out the sulfonated hydrocarbon, and drying the precipitate.

17. A method according to claim 1 in which the precipitate obtained by diluting the sulfuric acid solution is boiled with water for an extended time.

18. A method according to claim 5 in which the precipitate obtained by diluting the sulfuric acid solution is boiled with water for an extended time.

SERGE ALEXANDER LOUKOMSKY.
HAROLD TALBOT LACEY.